United States Patent

McNabney

[11] 3,719,321
[45] March 6, 1973

[54] AIR FLOW CONTROL DEVICE
[75] Inventor: John C. McNabney, La Crosse, Wis.
[73] Assignee: The Trane Company, La Crosse, Wis.
[22] Filed: May 20, 1971
[21] Appl. No.: 145,167

[52] U.S. Cl. ................................... 236/49, 137/486
[51] Int. Cl. ...................... G05d 7/01, G05d 23/12
[58] Field of Search ...... 236/13, 49, 85, 80; 137/486, 137/487; 165/16

[56] References Cited

UNITED STATES PATENTS

| | | |
|---|---|---|
| 3,037,702 | 6/1962 | Mauer et al. ........................... 236/13 |
| 2,922,580 | 1/1960 | Phillips et al. ........................ 236/13 |
| 3,602,427 | 8/1971 | Joesting .............................. 236/1 B |
| 2,778,372 | 1/1957 | Jaquith .............................. 137/111 |
| 2,790,372 | 4/1957 | Cooper ................................ 98/41 |

Primary Examiner—William E. Wayner
Attorney—Arthur O. Andersen, Robert E. Lowe and Carl M. Lewis

[57] ABSTRACT

Pneumatically operated air flow control devices for use in a variable air volume conditioning system, wherein air volume rate is normally controlled by temperature responsive means, and including pressure responsive means to override the temperature responsive means under prescribed conditions.

10 Claims, 2 Drawing Figures

PATENTED MAR 6 1973          3,719,321

INVENTOR.
JOHN C. MC NABNEY
BY
ATTORNEY

AIR FLOW CONTROL DEVICE

BACKGROUND OF THE INVENTION

Building air distribution systems which service buildings having a plurality of rooms or zones may be of two basic types. One such type provides conditioned air from a central source with the temperature of the air being varied in accordance with the temperature in the zone. A second type provides conditioned air from a central source at constant temperature, and in which the rate of air flow to the zone is varied in accordance with zone temperature.

In the latter system, air is generally supplied to some type of terminal box or diffuser located at the zone, from which the air is delivered to the zone itself. Such diffusers are designed to deliver the air as efficiently and noiselessly as possible. It is therefore important that the air system and the diffusers be matched and controlled so that air is not delivered to the diffuser at a rate that far exceeds the design limitations of the diffuser.

SUMMARY OF THE INVENTION

It is an object of the present invention to provide an air flow control arrangement for variable air volume systems in which the design limits of the diffuser components are not exceeded.

A further object is to provide an air flow control arrangement which is normally responsive to zone temperature requirements.

A still further object is to provide an air flow control arrangement which can be responsive to temperature or pressure under prescribed conditions.

Yet a further object is to provide an air flow control arrangement which does not require electrical power for its operation.

The present invention provides a pneumatic air velocity control system including a pneumatic thermostat controlling a damper in the air stream. Velocity pressure sensing means are provided in the air supply to signal an excess air velocity. A pressure responsive means is actuated to alter the thermostatic signal and reduce air velocity.

DESCRIPTION OF PREFERRED EMBODIMENTS

Figure 1:
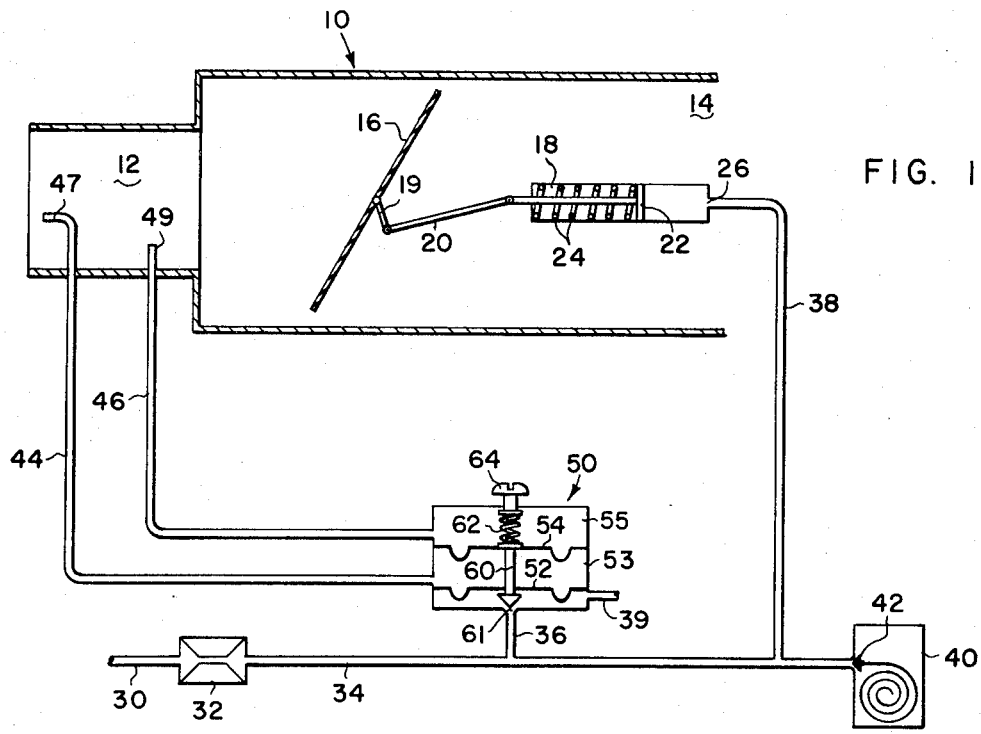
Figure 2:
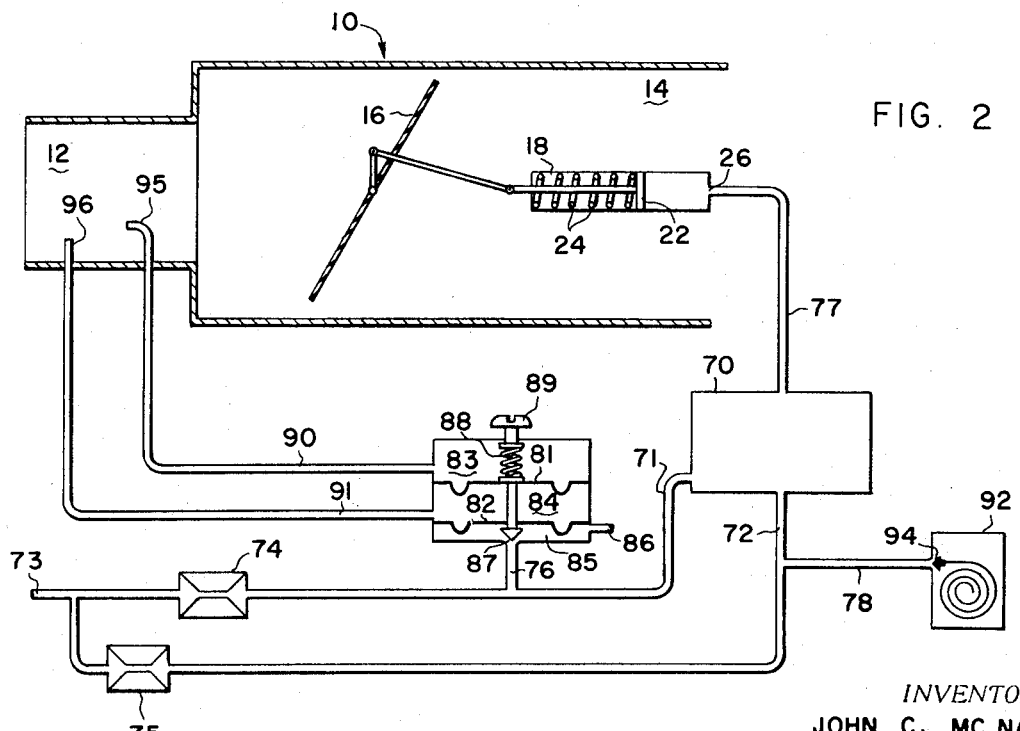

The invention will be more fully described by reference to the accompanying drawings in which:

FIG. 1 is a schematic view of an air terminal unit and it related controls depicting one embodiment of the invention, and FIG. 2 is a schematic view of an air terminal unit and its related controls depicting a further embodiment of the invention.

With particular reference to FIG. 1, an air terminal unit is indicated generally at 10, having an inlet portion 12 and and outlet portion 14. Within the terminal unit 10 is a damper mechanism including damper blade 16, damper actuator 18, and lever arms 19 and 20. Damper actuator 18 includes a piston 22 and spring 24, which acts upon piston 22. The action of the spring 24 urges piston 22 in a direction which tends to close damper blade 16. The opposite side of piston 22 communicates with the control air supply from line 38 by means of a port 26, the control air urging the piston 22 in a direction which tends to open damper blade 16.

Control air for the system is supplied from a main air supply through line 30, restrictor 32 and lines 34, 36, and 38. Line 34 terminates at pneumatic thermostat 40. Flow of air into thermostat 40 is controlled by temperature responsive valve 42.

The present system includes pressure responsive device 50. Pressure responsive device 50 is divided into three discreet chambers by means of diaphragms 52 and 54. The lower chamber 51 communicates with the control air supply through line 36 and with the atmosphere through bleed port 39. The intermediate chamber 53 communicates with inlet 12 via line 44, and the upper chamber 55 communicates with inlet 12 via line 46.

The end of line 44 within inlet 12 terminates in probe portion 47 which is oriented directly upstream of the conditioned air flow, so that it senses the velocity pressure of the air flow. Line 46 terminates in probe portion 49, also located within inlet 12 and oriented perpendicular to the conditioned air stream. The orientation of the probe portions 47 and 49 within the conditioned air stream causes a pressure transmission to chambers 53 and 55 such that chamber 53 may be characterized as a high pressure chamber, and chamber 55 may be characterized as a low pressure chamber, both with respect to each other.

Connecting diaphragms 52 and 54 is valve stem 60, the lower portion of which is adapted to be received into port 61, formed at the entrance of line 36 to pressure responsive device 50. Valve stem 60 is urged toward a closed position by spring 62 which may be adjusted by means of set screw 64.

In operation, the system is adapted to supply conditioned air to a zone or zones in response to zone temperature under normal operating conditions. This objective may be accomplished through the influence of the thermostat 40, which may be located in the zone, upon the position of damper blade 16. While the system may be adapted to supply either heated or cooled conditioned air to the zone, for the purposes of description it will be assumed that cooled conditioned air at substantially lower temperature than the temperature of the zone is supplied.

Under the aforementioned conditions, an increase in zone temperature indicates a requirement for increased conditioned air flow. Thus, an increase in temperature causes valve 42 to move toward the orifice of line 34 to decrease the flow of control air to thermostat 40. This action causes an increase in control air pressure on piston 22, causing it to compress spring 24 and through the action of levers 19 and 20 move damper 16 to a more open position, allowing an increase in air volume through terminal 10, thus providing additional cooling to the zone.

As the zone temperature falls below the desired set point, essentially the reverse action takes place. Thus, valve 42 moves away from the orifice at line 34, allowing more air to be bled through thermostat 40. This action decreases the air pressure at piston 22, allowing it to move under the urging of spring 24, moving damper blade 16 toward a more closed position.

While the action just described may provide adequate control under ordinary circumstance, such a system may not be satisfactory under unusual conditions. For example, an unusually high heat load in the zone may cause the damper blade 16 to be driven to a full or nearly full open position. While such a damper position will allow maximum air flow through the air terminal unit 10, it may well be desirable to limit the air flow to something less than the maximum provided by the source. For example, acoustical factors may dictate that the air flow through a terminal be kept within prescribed limits.

Accordingly, the present system includes pressure responsive device 50 to act as an air volume limiter. Increased air flow through inlet portion 12 will be sensed by probe portion 47 of line 44, and increased pressure will be transmitted to intermediate chamber 53. At the same time, a decreased pressure will occur in upper chamber 55 by the action of the air flow on probe portion 49 of line 46.

The differential pressures in chambers 53 and 55 will cause valve stem 60 to be displaced upwardly, away from port 61. This in turn causes control air to be bled from line 34, through line 36 and lower chamber 51 to bleed port 39. The exhausting of air through bleed port 39 causes a reduction in control air pressure at piston 22, allowing spring 24 to urge damper blade 16 toward a more closed position.

The conditioned air flow through terminal unit 10 is reduced upon closing of damper blade 16. This reduction in air flow causes a decreased pressure differential between intermediate chamber 53 and upper chamber 55, allowing valve stem 60 to move downwardly urged by spring 62, thereby closing port 61 and returning control air pressure directly to thermostat 40.

The principles of the present invention can be applied using various types of pneumatic control components. For example, a highest pressure selective relay 70 may be employed to advantage in the present system. By highest pressure selective relay I refer to a pneumatic device having air inputs from a plurality of sources at different pressures, and having a single output. The relay selects the highest of the input pressures and passes only that pressure to the outlet. A variety of such relays are commercially available, such as Model R 432-2 manufactured by Robertshaw Controls Corporation and Model RL 782HP manufactured by Powers Regulator Company.

In the present system, relay 70 is provided with air via conduits 71 and 72, which are ultimately fed from a common source of control air through conduit 73. Control air supplied to conduit 71 passes first through restrictor 74, and control air supplied to conduit 72 passes first through restrictor 75.

Valve 87 of pressure responsive device 87 is normally open allowing substantially all of the air passing through restrictor 74 to pass through conduit 76, lower chamber 85, and out through bleed port 86; thereby establishing a very low, or substantially zero pressure entering relay 70 from conduit 71. Under normal operation then, the pressure at relay 70 from conduit 72 will be greater than that from conduit 71 and the pressure out of relay 70 through conduit 77 will be substantially equal to the input pressure at conduit 72.

The pressure in conduit 72 is varied in response to temperature in the conditioned zone by thermostat 92, having valve 94 to close and open the port at conduit 78 and thereby vary the pressure in conduit 72. Thermostat 92 is preferably of the type wherein valve 94 moves away from conduit 78 upon temperature rise, creating a reduced pressure in conduit 72.

The output pressure from relay 70 is passed to damper actuator 18 by means of conduit 77, whereby said pressure can act on piston 22 and against the spring tension of spring 24. Damper 16 in this embodiment is normally open, that is, reduced air pressure at piston 22 allows the extension of spring 24, which in this case, moves damper 16 toward an open position.

In normal operation, assuming again that cooled conditioned air is being supplied, a rise in temperature in the zone will cause valve 94 of thermostat 92 to open and bleed air through thermostat 92. This reduces the pressure in conduit 72, thereby reducing the pressure in conduit 77 and damper actuator 18, allowing piston 22 to move damper 16 to a more open position and admit more cooled air to the zone. The reverse sequence takes place upon a fall in zone temperature.

Under certain conditions, the zone thermostat 92 may call for an air flow volume which exceeds the design characteristics of the air terminal unit 10, which might; for example, occur during a period of unusually high heat load in the zone to be conditioned.

In such a case, damper 16 will be moved to an open position through the action of thermostat 92 and damper actuator 18 as previously described in detail. The increased flow of air thus admitted through inlet portion 12 will be sensed by probes 95 and 96; probe 95 oriented into the airstream to sense static pressure plus velocity pressure, and probe 96 oriented to sense static pressure minus velocity pressure. These pressures will be transmitted to pressure responsive device 80 via conduits 90 and 91 respectively.

The pressure differential thus created between upper chamber 83 and intermediate chamber 84 displaces upper diaphragm 81 and valve 87 downwardly, closing off conduit 76 from lower chamber 85. Control air passing through restrictor 74 is thus channeled through conduit 71 to relay 70. Since valve 94 of thermostat 92 is in an opened condition, control air passing through restrictor 75 is bled off through conduit 78, creating a relatively low pressure input to relay 70. If desired, restrictors 74 and 75 can be sized to insure a higher pressure input to relay 70 at conduit 71 when valve 87 is closed. For example, restrictor 94 may have an orifice diameter of about 0.007 inches, and restrictor 75 may have an orifice diameter of about 0.005 inches. It will be understood that such specific orifice diameter are by way of example only and should not be construed as limiting the present invention.

Since relay 70 is a high pressure selective relay, the higher pressure at conduit 71 will be reflected in the output conduit 77. This pressure will then act against piston 22 to move damper 16 toward a closed position to reduce the air flow through air terminal unit 10. When the flow has been reduced to a predetermined, acceptable level, the pressure in chamber 83 and chamber 84 as transmitted by conduits 90 and 91 from probe portions 95 and 96 will be reduced, allowing valve 87 to move away from conduit 76, allowing control air in conduit 71 to be bled through pressure responsive device 80, thereby returning control of the damper 16 to thermostat 92.

Thus it can be seen that the present invention provides for the positive control of a variable air volume system. The control system can be pneumatically operated and provide for control in response to temperature under most conditions, but further providing for an overriding control responsive to conditioned air flow.

While in the foregoing specification certain aspects and embodiments of the present invention have been described in considerable detail, it will be understood that such detail is by way of illustration and that the invention is to be limited only by the scope of the appended claims.

I claim:

1. In an air distribution system in which conditioned air at substantially constant temperature is delivered to a plurality of zones, the improved control system comprising:
   a. damper means to vary the volume of conditioned air delivered to at least one of said zones;
   b. a pneumatic thermostat responsive to the temperature in said zone;
   c. sensing means for measuring the velocity pressure of said conditioned air near said zone;
   d. pressure responsive means communicating with said sensing means;
   e. damper actuating means normally responsive to said thermostat, said damper actuating means being responsive to said pressure responsive means when said velocity pressure exceeds a preselected maximum.

2. The system of claim 1 including pneumatic relay means, said relay having a plurality of air inputs at different pressures and a single air output pressure.

3. The system of claim 2 wherein said air output pressure is substantially equal to one of said air input pressures.

4. The system of claim 3 wherein said air output pressure is substantially equal to the greatest of said air input pressures.

5. The system of claim 1 wherein said sensing means comprises a pair of conduit probes projecting into the stream of conditioned air, one of said probes being oriented substantially upstream of the flow of conditioned air and the other of said probes being oriented substantially transverse to the flow of conditioned air.

6. The system of claim 5 wherein said pressure responsive means includes a plurality of discreet chambers, each of said chambers separated from the adjacent chamber by means of a flexible diaphragm.

7. The system of claim 6 wherein one of said probes communicates with one of said chambers, and the other of said probes communicates with another of said chambers.

8. In an air distribution system for delivering air at substantially constant temperature to a plurality of zones, the improvement including an air terminal unit for delivering conditioned air to at least one of said zones, said unit having movable damper means for varying the volume of air delivered to said zone, temperature responsive means to cause a first pneumatic signal to vary the position of said damper means in response to the temperature in said zone, sensing means in said unit to sense variations in the rate of conditioned air flow into said unit, said sensing means communicating with pressure responsive means movable in response to changes in said rate of conditioned air flow indicated by said sensing means, said pressure responsive means including valve means actuated in response to the movement of said pressure responsive means to cause a second pneumatic signal to vary the position of said damper means when said rate of conditioned air exceeds a predetermined maximum rate, said second signal overriding said first signal.

9. An air distribution control system comprising:
   a. an air terminal unit for receiving conditioned air from a source and directing said air into a space to be conditioned;
   b. damper means in said air terminal unit to vary the volume of conditioned air passing to said space;
   c. damper actuating means operably connected to said damper and including a piston; said piston being movable in a first direction through expansion of a spring to move said damper toward an open position, said piston being movable in the reverse direction by air pressure sufficient to compress said spring to move said damper toward a closed position;
   d. a pneumatic thermostat adapted to respond to the temperature of said space;
   e. pressure responsive means communicating with said air terminal unit responsive to the pressure in said air terminal unit;
   f. relay means communicating with said thermostat, said pressure responsive means, and said damper actuating means, said relay being adapted to select the greater of the air pressures received from said thermostat and said pressure responsive means and providing said greater pressure to said damper actuating means.

10. The system of claim 9 wherein said pressure responsive means provides an air pressure to said relay which is greater than the pressure provided to said relay by said thermostat when the velocity pressure in said air terminal unit exceeds a predetermined maximum.

* * * * *